United States Patent
Yang et al.

(10) Patent No.: US 12,277,111 B2
(45) Date of Patent: Apr. 15, 2025

(54) REPORT EDITING METHOD FOR SCADA SYSTEM

(71) Applicant: DELTA ELECTRONICS, INC., Taoyuan (TW)

(72) Inventors: Shih-Jui Yang, Taoyuan (TW); Yi-Sin Wang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 18/075,403

(22) Filed: Dec. 5, 2022

(65) Prior Publication Data

US 2024/0111763 A1 Apr. 4, 2024

(30) Foreign Application Priority Data

Sep. 30, 2022 (CN) .......................... 202211217567.5

(51) Int. Cl.
- *G06F 16/24* (2019.01)
- *G06F 16/21* (2019.01)
- *G06F 16/242* (2019.01)

(52) U.S. Cl.
CPC ........ *G06F 16/2428* (2019.01); *G06F 16/219* (2019.01)

(58) Field of Classification Search
CPC .................................................. G06F 16/2428
USPC ........................................................ 707/805
See application file for complete search history.

(56) References Cited

U.S. PATENT DOCUMENTS

| | | | |
|---|---|---|---|
| 2006/0112399 A1* | 5/2006 | Lessly | G06F 8/38 |
| | | | 719/318 |
| 2009/0276072 A1 | 11/2009 | Grove et al. | |
| 2013/0031499 A1* | 1/2013 | Vishnubhatta | G06Q 10/06 |
| | | | 707/E17.061 |
| 2015/0220076 A1 | 8/2015 | Uchida | |
| 2017/0227944 A1 | 8/2017 | Goli et al. | |
| 2018/0225177 A1* | 8/2018 | Bhagi | G06F 11/1451 |

FOREIGN PATENT DOCUMENTS

| | | | | |
|---|---|---|---|---|
| CN | 101763267 A | * | 6/2010 | ........... G06F 9/4443 |
| CN | 102077146 B | | 5/2014 | |
| CN | 104756023 A | | 7/2015 | |

(Continued)

OTHER PUBLICATIONS

Office Action dated Feb. 23, 2023 of the corresponding Taiwan patent application No. 111137164.

*Primary Examiner* — Syling Yen

(74) *Attorney, Agent, or Firm* — Chun-Ming Shih; HDLS IPR SERVICES

(57) ABSTRACT

A report editing method for a supervisory control and data acquisition (SCADA) system is disclosed and includes following steps: when a window interface is triggered to open, determining whether a binding label exists in a register of a variable library of the SCADA system; if the binding label exists, reading report data corresponding to the binding label from an edited-data file to import the report data into the window interface; if the binding label does not exist, obtaining multiple report items through the window interface to create and store new report data to the edited-data file; and writing a new binding label corresponding to the new report data to the variable library to bind the window interface with the new report data.

15 Claims, 10 Drawing Sheets

(56) References Cited

FOREIGN PATENT DOCUMENTS

| CN | 107066252 | A | | 8/2017 | |
|----|-----------|---|---|--------|---|
| CN | 112464119 | A | * | 3/2021 | ......... G06F 16/9577 |
| TW | M590730 | U | | 2/2020 | |
| TW | 202203617 | A | | 1/2022 | |

* cited by examiner

REPORT EDITING METHOD FOR SCADA SYSTEM

BACKGROUND OF THE DISCLOSURE

Technical Field

The present disclosure relates to a SCADA system, and specifically to a report editing method for the SCADA system.

Description of Related Art

A supervisory control and data acquisition (SCADA) system is a system capable of monitoring procedures and collecting data, which is usually applied to various environments, production lines, systems, and devices and allows administrators to use the SCADA system to monitor, collect, and export required data.

The existed SCADA system can only export historical data stored in the database to produce a report with a fixed format while users are not allowed to arbitrarily set exporting conditions (only time setting is allowed). For example, even though one production line is adequate to produce multiple products, the existed SCADA system can only produce a comprehensive report for the multiple products in accordance with a report category (e.g., a daily report and a weekly report, etc.) selected by the user. In other words, the content of the report includes a total amount of the production line and cannot be separated by different products.

In addition, while using the existed SCADA system, the user cannot edit through an interface to copy and modify data of a finished report, nor add or reduce fields of the report instantly.

Furthermore, if the user wants to do a conditional inquiry to historical data of a database, it is usual to add structured query language (SQL) conditions to a script program of the SCADA system, so that the conditional inquiry can be performed to the historical data of the database according to the SQL conditions. However, an administrator or engineer at the user-end may be short of SQL coding skills, so they don't know how to add the SQL conditions through the aforementioned approach. Also, since there are many objects (e.g., buttons or drop-down menus, etc.) on a window interface of the SCADA system, the SQL conditions might be spread over the script program where different objects exist. As a result, maintaining the script program is quite difficult.

SUMMARY OF THE DISCLOSURE

The present disclosure is directed to a report editing method for a SCADA system, which enables a window interface to automatically import a bound edited report and allows the user to re-edit the edited report.

In one of the exemplary embodiments, the report editing method of the present disclosure includes the following steps: a) determining whether a binding label exists in a register of a variable library of the SCADA system when a window interface is opened; b) when the binding label exists, inquiring an edited-data file in accordance with the binding label to read report data (or a piece of report data) corresponding to the binding label; c) when no binding label exists, obtaining multiple report items through the window interface to create and store new report data (or a piece of new report data) to the edited-data file, wherein the multiple report items include a report title, a report category, a datasheet, and multiple parameter fields; and, d) writing a new binding label corresponding to the new report data to the variable library to bind the window interface with the new report.

In comparison with related arts, the SCADA system of the present disclosure may automatically import a bound edited report into each editing area of the window interface in a pre-load stage, so that the user may directly export report data or re-edit the edited report being imported.

DETAILED DESCRIPTION OF THE DISCLOSURE

In cooperation with the attached drawings, the technical contents and detailed description of the present disclosure are described hereinafter according to multiple embodiments, being not used to limit its executing scope. Any equivalent variation and modification made according to appended claims is all covered by the claims claimed by the present disclosure.

The present disclosure discloses a report editing method for supervisory control and data acquisition (SCADA) system (referred to an editing method).

Figure 1:
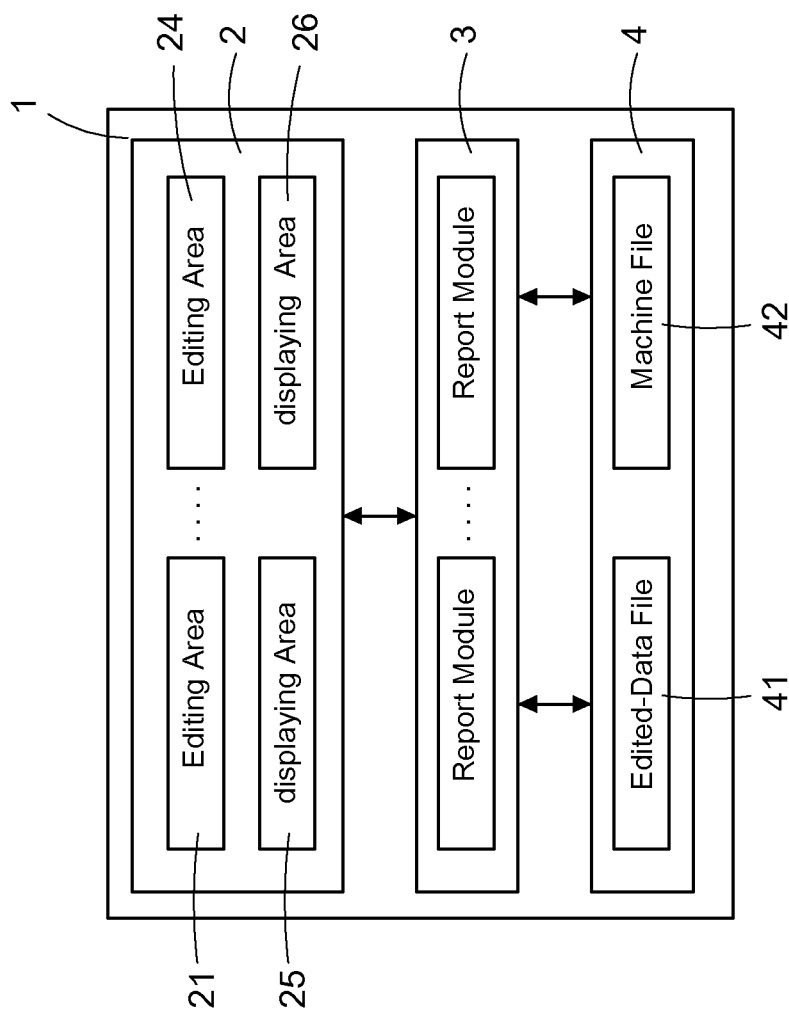
FIG. 1 is a schematic diagram showing a system of an embodiment according to the present disclosure.

As shown in FIG. 1, the SCADA system 1 of the present disclosure includes a window script program 2, multiple report modules 3, and a database 4. The window script program 2 includes multiple functional modules of multiple editing areas 21-24, and the editing areas 21-24 are configured to receive character input and menu manipulation from the user. The multiple report modules 3 are corresponding to the multiple editing areas 21-24, and the multiple report modules 3 access the database 4 based on the character input and the menu manipulation received by the editing areas 21-24. The window script program 2 further includes multiple functional modules of multiple displaying areas 25-26, wherein the displaying area 25 displays the report title of a bound report and the displaying area 26 displays machine raw data retrieved from the database 4.

Referring to the hardware structure (not shown in the drawings), the SCADA system 1 includes at least one personal computer (PC) and one data center. The PC includes a processor, a memory, a user input interface, and a displayer. The window script program 2 and the multiple report modules 3 may be compiled as program code to store in the memory. The processor is connected with the memory, the user input interface, and the displayer, so the processor receives the character input and the menu manipulation through the user input interface and executes the window script program 2 and the multiple report modules 3 to generate a processing result in accordance with the input made by the user. The displayer is configured to display the images related to the multiple editing areas 21-24 and the multiple displaying areas 25-26, and display the images of the processing result generated by the processor through executing the window script program 2. The data center may be a cloud hard-drive or a cloud server. The data center is configured to implement the database 4. In one embodiment, the database 4 may also be implemented by a memory embedded in the PC.

Figure 2:
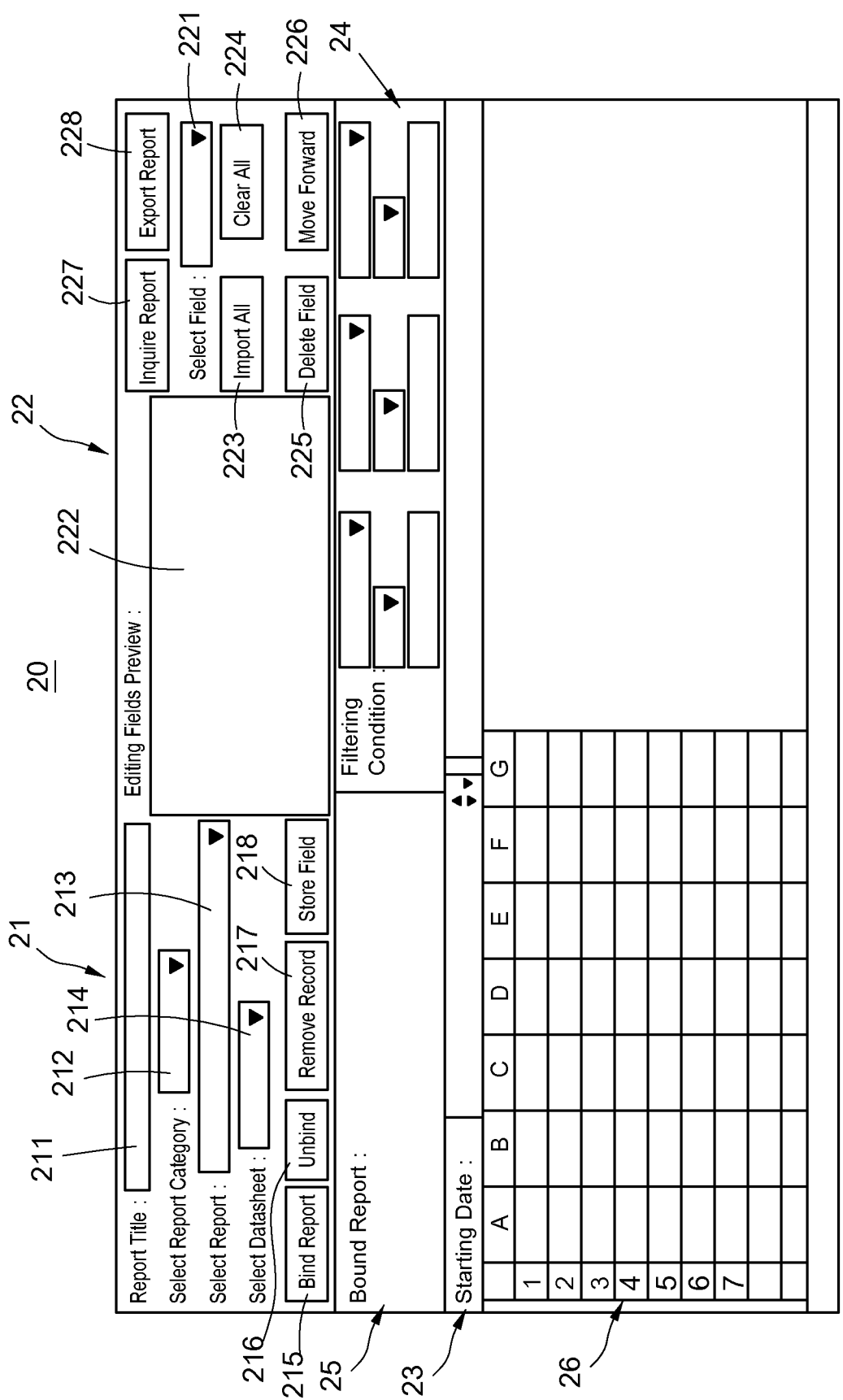
FIG. 2 is a schematic diagram showing a window interface of an embodiment according to the present disclosure.

The database 4 includes an edited-data file 41 and a machine-data file 42. In one embodiment, the edited-data file 41 records report data of an edited report(s) and the machine-data file 42 records raw data of the SCADA system 1. For example, the machine-data file 42 records statistics data and historical data, etc., of multiple machines of the production line. As shown in FIG. 2, when the window script program 2 is executed, the window interface may be activated to open. The window interface 20 displays multiple editing areas 21-24, and the user may perform character input or menu manipulation through the editing areas 21-24 to edit multiple categories of reports.

In particular, the editing areas 21-24 are used to input the received character or menu content to the corresponding functional modules, functions, or subroutines of the window script program 2 to call the report module(s) 3 to access the database 4, so as to obtain corresponding data from the database 4. In one embodiment, the window script program 2 may be executed in multiple window interfaces 20, and the user may respectively edit and export multiple reports through the multiple window interfaces 20.

It should be mentioned that the report modules 3 are created on the basis of SQL. By using SQL function or SQL commands, the report modules 3 may inquire the database 4 in accordance with the condition(s) set by the user to obtain the required data. According to creating the report modules 3, the user may directly use the editing areas 21-24 of the window script program 2 to perform the conditional inquiry to the database 4 of the SCADA system 1 even if the user is incapable of coding in SQL. Therefore, it is convenient for the user in editing the report's formats, fields, and contents. When the administrator or the developer needs to maintain the SQL program, he or she only needs to update the report modules 3 instead of checking the whole program code of every editing areas 21-24 of the window script program 2. As a result, the convenience of maintaining the program is increased.

As shown in FIG. 2, the window interface 20 displays a report-item editing area 21, a field editing area 22, a time editing area 23, a filter editing area 24, a bound-report displaying area 25, and a report displaying area 26. In the embodiment, the multiple editing areas 21-24 include input fields and drop-down menus, but not limited thereto.

The report-item editing area 21 is used to receive character input and menu manipulation. In particular, the report-item editing area 21 includes a report-title field 211, a report-category menu 212, a historical-report menu 213, and a datasheet menu 214. The report-title field 211 is an input field for the user to input a report title. The report-category menu 212, the historical-report menu 213, and the datasheet menu 214 are drop-down menus, but not limited thereto. The report-category menu 212 is used for the user to select a required report category, such as a daily report, a weekly report, a monthly report, a time-interval report, an activation report, a first pass yield (FPY) report, a yield report, and a capacity utilization report, etc. The historical-report menu 213 is used for the user to select a historical report that is previously created and stored.

The datasheet menu 214 is used for the user to select a datasheet that is corresponding to a required report category or a required historical report. The datasheet is corresponding to a specific product category (e.g., a temperature regulator or a motor screw, etc.) of the environment (e.g., a factory) of the SCADA system 1. Different datasheets may include different amounts and different categories of parameter fields, each of the parameter fields respectively records the parameter such as product density, product thickness, product width, energy consumption, productivity, and line speed, etc., but not limited thereto.

Figure 5:
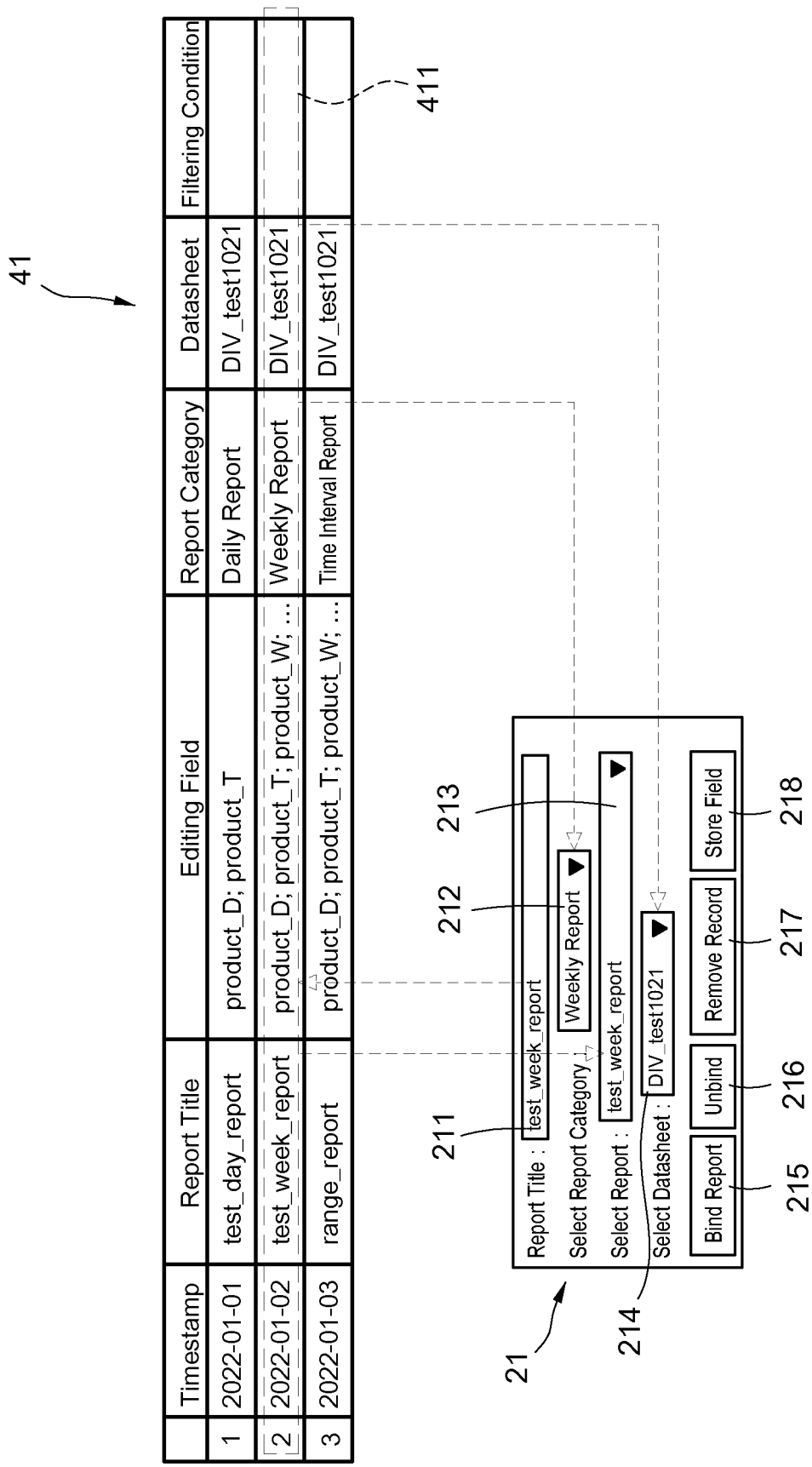
FIG. 5 is a schematic diagram of an edited-data file of an embodiment according to the present disclosure.

The report-item editing area 21 further includes multiple buttons 215-218. The button 215 (a "bind report" button as shown in FIG. 2) is pressed to trigger the window script program 2 to be bound with a report according to the setting of the report-title field 211, the report-category menu 212, the historical-report menu 213, and the datasheet menu 214. Therefore, the bound-report displaying area 25 may display the title of the report being bound (also called a bound report) with the window interface 20. The button 216 (an "unbind" button as shown in FIG. 2) is pressed to relieve the bound report. The button 217 (a "remove record" button as shown in FIG. 2) is pressed to clear the setting of the report-title field 211, the report-category menu 212, the historical-report menu 213, and the datasheet menu 214 and to remove one report data 411 (as shown in FIG. 5) from the edited-data file 41. The button 218 (a "store field" button as shown in FIG. 2) is pressed to store all the input data currently in the window interface 20 to the edited-data file 41.

The field editing area 22 is used to receive menu manipulation. The field editing area 22 includes a field menu 221 and an editing fields preview 222. The field menu 221 provides multiple parameters or multiple items for the user to select and adds the parameter(s) or item(s) selected by the user to the editing fields preview 222, so as to edit and preview multiple parameter fields of a report.

The field editing area 22 further includes multiple buttons 223-228. The button 223 (a "import all" button as shown in FIG. 2) is pressed to import all the parameters or items of the field menu 221 into the editing fields preview 222. The button 224 (a "clear all" button as shown in FIG. 2) is pressed to clear all the parameters or items displayed in the editing fields preview 222. The button 225 (a "delete field" button as shown in FIG. 2) is pressed to delete at least one parameter or item selected by the field menu 221 from the editing fields preview 222. The button 226 (a "move forward" button as shown in FIG. 2) is pressed to move at least one parameter or item selected by the field menu 221 forward from the editing fields preview 222 to adjust an order of the parameters or items being displayed in the editing fields preview 222. The button 227 (a "inquire report" button as shown in FIG. 2) is pressed to trigger the window script program 2 to inquire a corresponding report data from the database 4 based on the setting of the report-item editing area 21, the field editing area 22, the time editing area 23, and the filter editing area 24 and to display the inquiring result in the report displaying area 26. The button 228 (a "export report" button as shown in FIG. 2) is pressed to trigger the window script program 2 to export a report.

The time editing area 23 is used to set a filtering time. The filtering time is a specific time or a period of time and is used to filter a time range for exporting a report correspondingly.

The filter editing area 24 is used to set a filtering condition (s) to the one or more parameters or items selected by the field menu 221. The filtering condition may be, for example one or more combinations that are greater than, equal to, or smaller than specific values, and the filtering condition is used to filter a value range of the report being exported.

The report displaying area 26 is used to display the setting of the editing fields preview 222 and the inquiring result of the report modules 3. More specific, the window script program 2 inquiries a corresponding report data from the database 4 through the report modules 3 in accordance with the setting of the report-item editing area 21, the field editing area 22, the time editing area 23, and the filter editing area 24, and the window script program 2 displays the inquiring result on the report displaying area 26 (as shown at the lower part of FIG. 2).

However, the above description is only one embodiment of the present disclosure. In other embodiments, a user may perform any combination of the following operations according to the actual need: setting the fields of a report, exporting a historical report directly, setting a filtering condition, setting a time parameter, editing a historical report, and creating a new report.

The technical feature of the present disclosure is that, after an edited report is finished through the user using the report-item editing area 21, the field editing area 22, the time editing area 23, and the filter editing area 24, the SCADA system 1 may store report data and binding label of the edited report to the edited-data file 41 and bind the window interface 20 with the binding label. When the user again executes the window script program 2, the SCADA system 1 may obtain the corresponding report data after inquiring the edited-data file 41 in accordance with the existed binding label, and then automatically import the multiple report items corresponding to the binding label into the multiple editing areas 21-24 of the window interface 20. Therefore, it is unnecessary for the user to create a new report from scratch. Besides, the user may re-edit the edited report by using the multiple editing areas 21-24 of the window interface 20, so as to implement a flexible report usage scenario.

Figure 3:
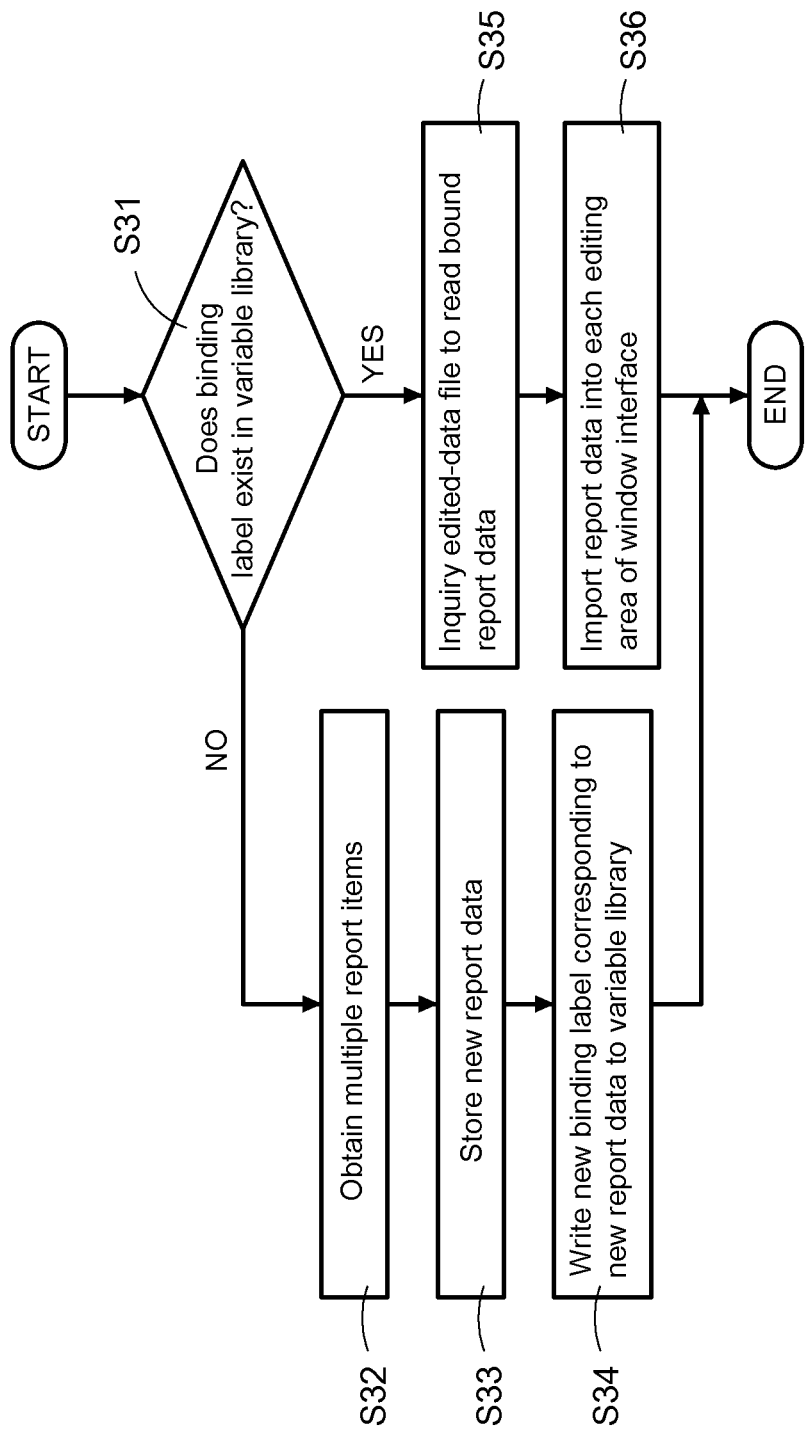
FIG. 3 is a flowchart of editing of an embodiment according to the present disclosure.

An editing flow is shown in FIG. 3 and applied to the SCADA system 1 shown in FIG. 1, and the editing flow may be implemented by the window script program 2 shown in FIG. 1 and the window interface 20 shown in FIG. 2.

As shown in FIG. 3, the window script program 2 of the SCADA system 1 determines whether a binding label exists in a register of a variable library (step S31). In other words, the window script program 2 determines whether the variable library is Null or has an invalid string (e.g., ###). If the variable library is Null or has an invalid string, it means no binding label exists in the variable library; if the variable library has a valid string, it means the binding label exists in the variable library.

In one embodiment, the binding label is recorded in the variable library in a string format. If the variable library has the binding label, it indicates that the database 4 has stored one bound report. If no binding label exists in the variable library, it indicates that no bound report is stored in the database 4.

If no binding label exists in the variable library, the user needs to create new report data by editing a blank report. When no binding label exists, the window interface 20 of the window script program 2 is used to receive user's operation to obtain multiple report items inputted or set by the user (step S32), so as to use a blank report to create a new report. After user's input and setting, the window script program 2 stores multiple report items as a record of new report data to the edited-data file 41 (step S33). Also, the window script program 2 writes a new binding label corresponding to the new report data to the variable library (step S34), so as to bind the window interface 20 with the new report data. The report data and the new report data respectively include multiple report items, and the multiple report items include a report title, a report category, a datasheet, and multiple parameter fields.

If the binding label is determined to be existed in the step S31, the window script program 2 inquiries the edited-data file 41 of the SCADA system 1 based on the binding label to read the report data that is corresponding to the binding label (step S35). Also, the window script program 2 automatically imports the multiple report items of the report data into the multiple editing areas 21-24 of the window interface 20 (step S36). Therefore, it is unnecessary for the user to create a new report from scratch.

In one embodiment, the binding label is the report title of the report data. After the user finishes one edited report and presses a bind report button 215, the window script program 2 writes the current report title to the register of the variable library to finish the binding procedure.

Figure 4:
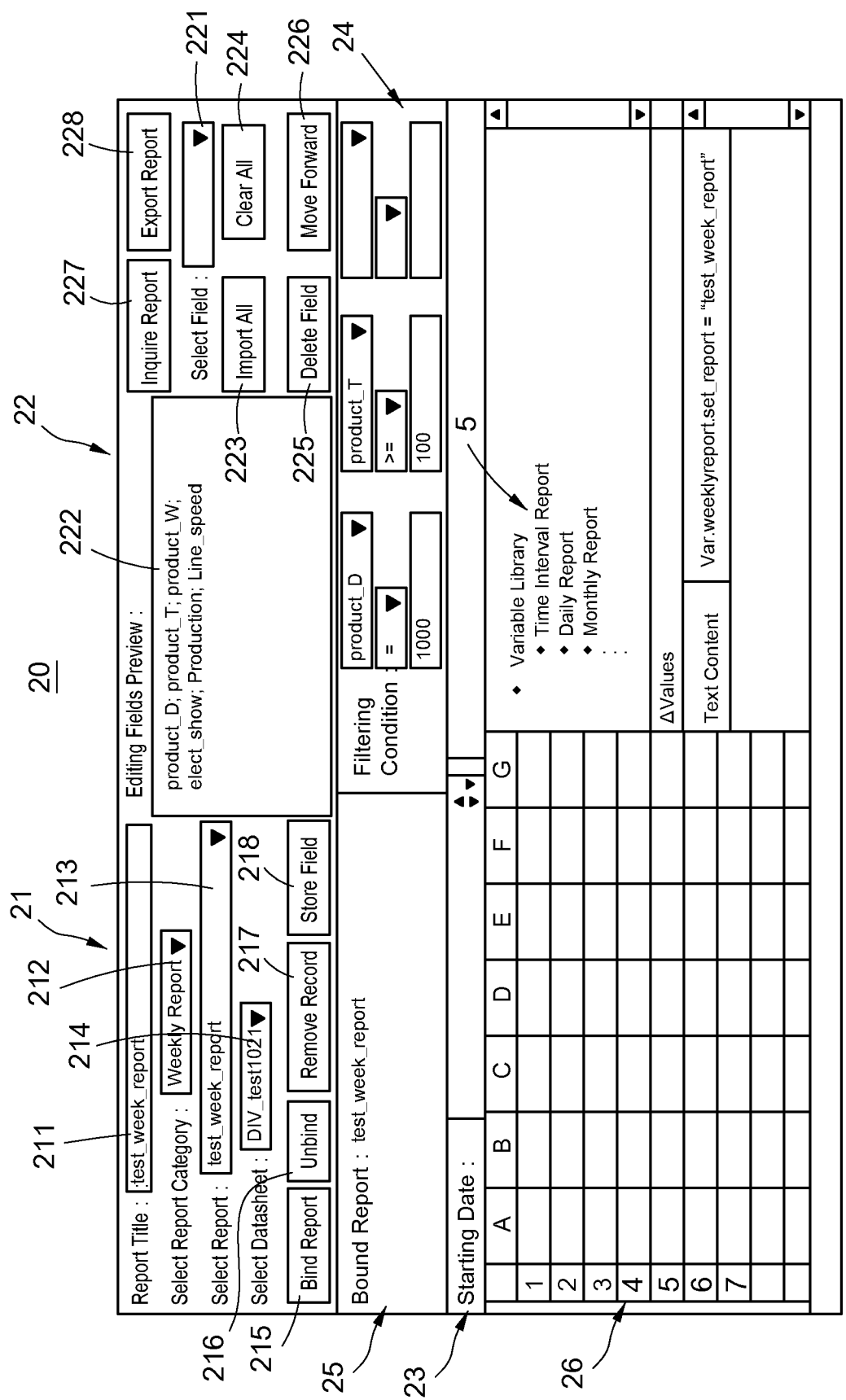
FIG. 4 is a schematic diagram showing binding inquiry of an embodiment according to the present disclosure.

As shown in FIG. 4, the register of the variable library 5 of the SCADA system 1 records a report title (e.g., test_week_report as shown in FIG. 4). In a pre-load stage, the window script program 2 inquiries the edited-data file 41 based on the report title (i.e., the binding label) to read the multiple report items corresponding to the report title and import the multiple report items into the window interface 20. For example, the report-item field 211 is imported with the report title "test_week_report", the report-category menu 212 is imported with "weekly report", the historical-report menu 213 is imported with "test_week_report", the datasheet menu 214 is imported with "DIV_test1021", the editing fields preview 222 is imported with items including "product_D", "product_T", "product_W", "elect_show", "Production", and "Line_Speed". The filter editing area 24 is imported with conditions including "product_D=1000" and "product_T>=100". Therefore, it is unnecessary for the user to create a new report from scratch.

As shown in FIG. 5, the edited-data file 41 includes multiple data rows, each of the data rows respectively records one report data 411. The report data 411 includes data fields such as a timestamp, a report title, an editing field, a report category, a datasheet, and a filtering condition. The skilled artisan may add or delete the data fields included in the report data 411 according to the actual need, and the content of the report data 411 is not limited to the above description.

Conceptually, the multiple report items of one report data 411 may be considered a set of multiple labels bound together, and each of the labels has a binding relationship with each other. The window script program 2 may inquiry the related label set (i.e., report items such as the timestamp, the editing field, the report category, the datasheet, and the filtering condition) from the edited-data file 41 by using the binding label (i.e., the report title) and import all labels of the report data 411 into the corresponding functions, so that the window interface 20 may display the importing result correspondingly.

More specifically, the window script program 2 determines that a binding label "test_week_report" exists in the register of the variable library 5 of the SCADA system 1 (as step S31 of FIG. 3). Next in the pre-load stage, the window script program 2 inquiries the edited-data file 41 in accordance with the binding label "test_week_report" to read the report data 411 bound with the window script program 2 (as step S35 of FIG. 3). Also, the window script program 2 automatically imports the multiple report items of the report data 411 into the multiple editing areas 21-24 of the window interface 20 (as step S36 of FIG. 3). For example, the window script program 2 imports the report tile into the historical-report menu 213, imports the report category into the report-category menu 212, imports the datasheet into the datasheet menu 214, imports the multiple parameter fields into the field menu 221 and the editing fields preview 222, imports at least one filtering condition into the filter editing area 24, and imports the filtering time into the time editing area 23.

Figure 6:
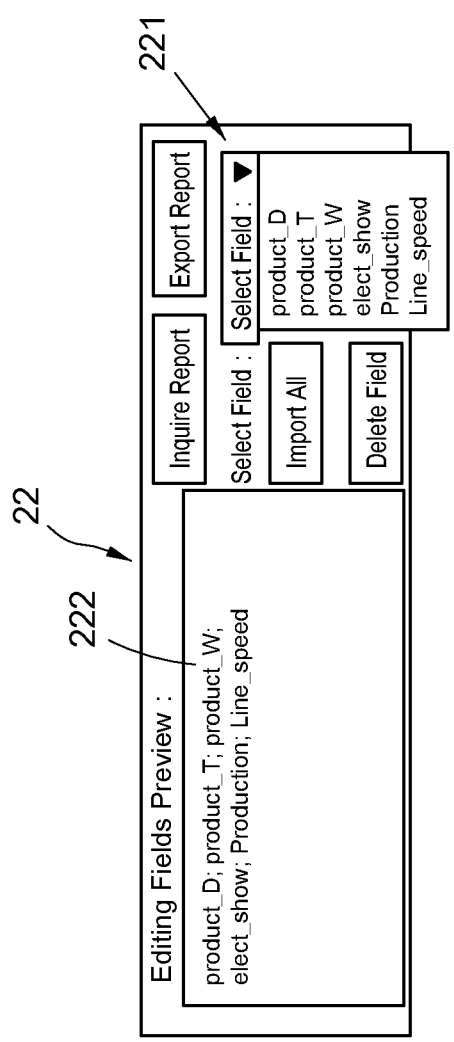
FIG. 6 is a schematic diagram of a report field of an embodiment according to the present disclosure.

FIG. 6 is discussed along with FIG. 5. According to the embodiment of FIG. 5, the window script program 2 automatically imports multiple items of the editing field of the report data 411 into the field editing area 22 of the window interface 20. For example, the window script program 2 imports items such as product density (product_D), product thickness (product_T), product width (product_W), energy consumption (elect_show), production (Production), and line speed (Line_Speed), etc. to the drop-down menu of the field menu 221 and the editing fields preview 222. Therefore, the user can automatically obtain an edited report being bound with the window interface 20 right after the window interface 20 is opened without inputting any information.

Figure 7:
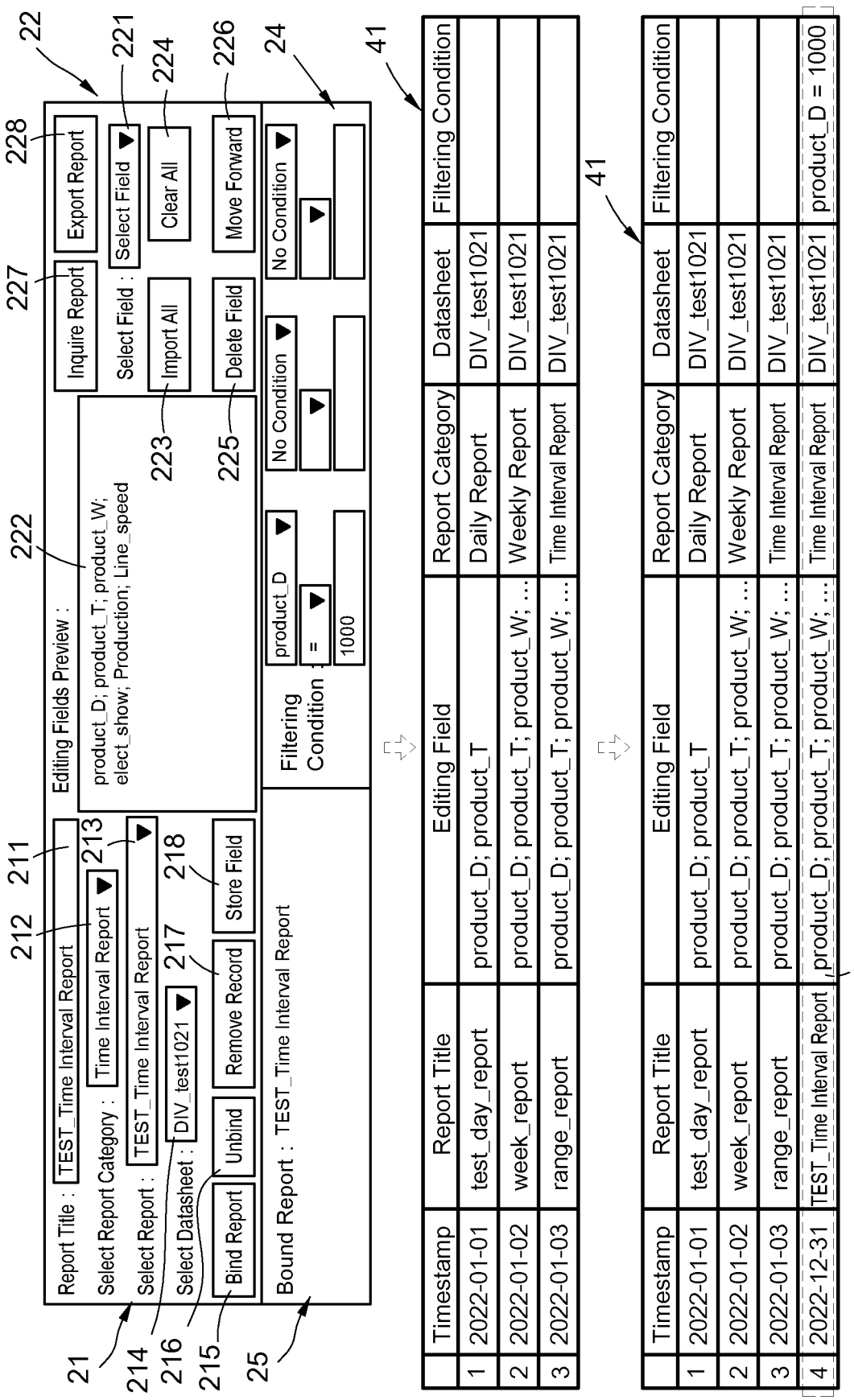
FIG. 7 is a schematic diagram of adding new report of an embodiment according to the present disclosure.

As shown in FIG. 7, after a new report is finished (e.g., changing the report title to "TEST time interval report" and adding a filtering condition "product_D=1000"), the user may press the store field button 218 to store the fields of the new report, so as to store all the input data in the window interface 20 into the edited-data file 41 to be new report data 412 (wherein the new report data 412 includes the filtering condition "product_D=1000"). When the user presses the bind report button 215 to bind the window interface 20 with the new report, the window script program 2 writes a new binding label (such as "TEST time interval report") to the register of the variable library 5 to implement the binding procedure.

After the binding procedure, the window script program 2 displays the new binding label (such as the report title of the new report) on the bound-report displaying area 25 to notify the user that the binding procedure has been finished. Next time when the user executes the window script program 2, the window script program 2 will import the new report data 412 that is corresponding to the new binding label.

Figure 8:
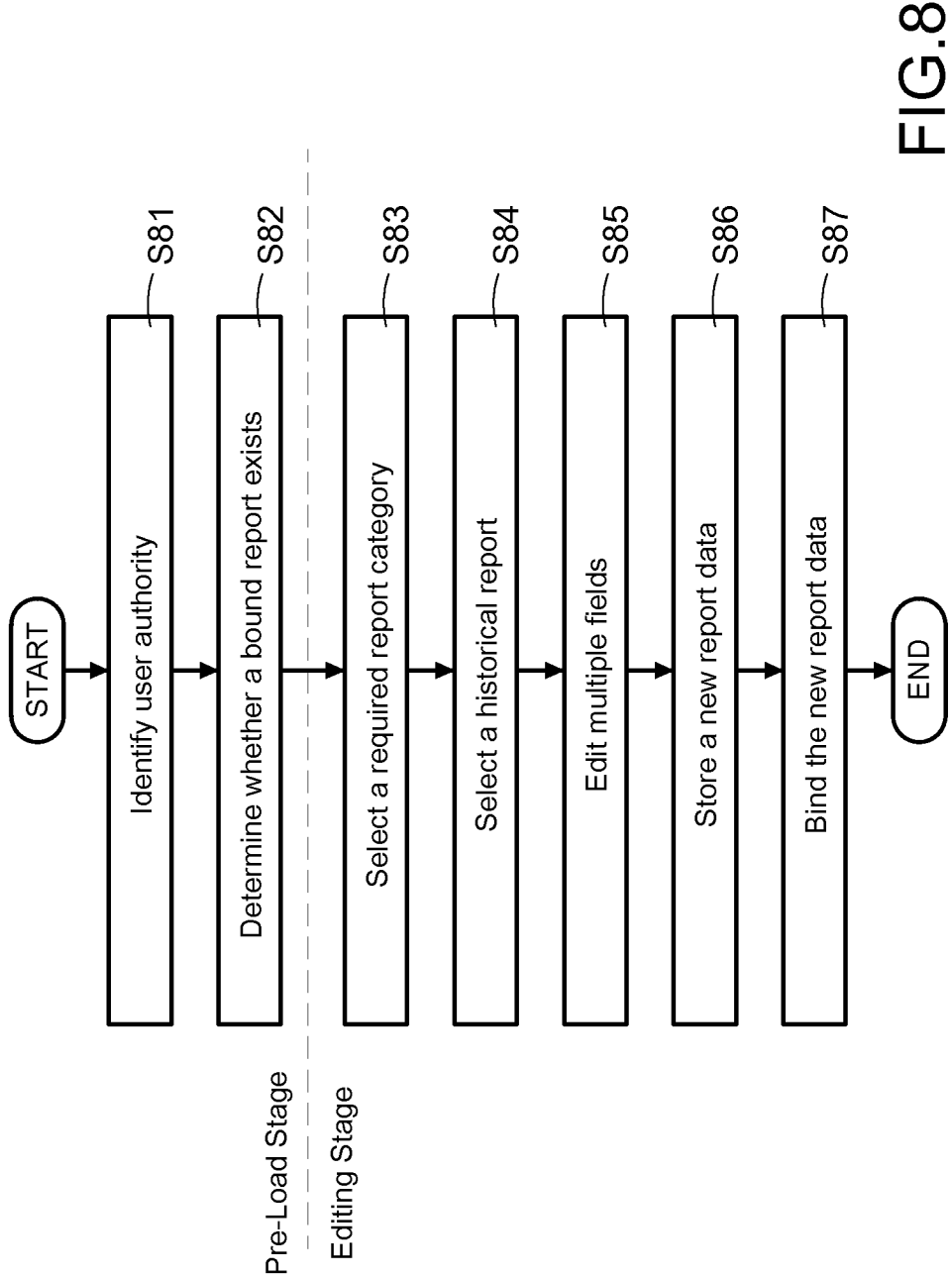
FIG. 8 is a system operating flowchart of an embodiment according to the present disclosure.

The flow shown in FIG. 8 is applied to the SCADA system 1, the window script program 2, and the window interface 20 as shown in FIG. 1 and FIG. 2. The system operation flow of the present disclosure includes a pre-load stage and an editing stage.

In the pre-load stage, the window script program 2 may first identify an authority of the user (step S81). In one embodiment, when the window script program 2 determines that the user does have an editing authority (e.g., the user is an administrator or an electrical engineer in a factory), the window script program 2 may enable the editing areas 21-24 to provide editing function, storing function, and binding function of the reports for the user. When the window script program 2 determines that the user doesn't have the editing authority (e.g., the user is a normal operator), then the window script program 2 only provide a report viewing function and a report exporting function to the user. In other words, users who don't have the editing authority are not allowed to edit the format, the content, and the fields of the reports.

Next, the window script program 2 determines whether a bound report exists (step S82). In particular, the window script program 2 accesses the register of the variable library 5 to determine whether the variable library 5 has a binding label. If the variable library 5 has the binding label, the window script program 2 obtains the report data corresponding to the binding label from the edited-data file 41 in according to the steps shown in FIG. 3 and automatically imports the multiple report items of the obtained report data into the multiple editing areas 21-24 correspondingly to display on the window interface 20. If the window script program 2 determines in the step S82 that no report is bound, then the window interface displays blank editing areas 21, 23-24, wherein the window script program 2 reads the multiple parameter fields corresponding to a datasheet from the machine file 42 based on the datasheet selected by the datasheet menu 214 and imports the multiple parameter fields into the field menu 221.

In the editing stage, the window script program 2 receives user's operation through the report-category menu 212 to select a required report category (step S83), and receives user's operation through the historical-report menu 213 to inquire multiple historical reports with the report category selected by the user from the edited-data file 41 and select one of the multiple historical reports (step S84). In one embodiment, after importing the bound report data, the window script program 2 may automatically fill in the report tile of the selected historical report to the report-title field 211. In another embodiment, if the window script program 2 determines that no bound report exists, then the user has to manually input a report title for a new report to the report-title field 211.

After the step S84, the window script program 2 imports a datasheet corresponding to the selected historical report into the datasheet menu 214 for the user to select.

After the user selects a required datasheet, the window script program 2 inquires the multiple parameter fields included in the selected datasheet from the machine file 42 and imports the multiple parameter fields into the field menu 221. Therefore, the window script program 2 may receive user's operation through the field menu 221 to add, delete, or move one or more of the parameter fields, and the parameter fields being operated are synchronously displayed on the editing fields preview 222 (step S85).

The window script program 2 may also receive user's operation through the filter editing area 24 to set a filtering condition for each of the parameter fields. The filtering condition is considered when the window script program 2 inquires the machine file 42 to limit the value range of the inquired data. In one embodiment, the filter editing area 24 records the filtering condition as a SQL program. In the embodiment, the report module 3 that is corresponding to the filter editing area 24 may use filtering condition being written as SQL program to inquire the machine file 42.

After the step S85, the user may trigger the store field button 218 on the window interface 20 to store the current status of the window interface 20 as a new edited report and correspondingly store new report data to the edited-data file 41 (step S86).

Besides, because the user has edited the report through the step S83 to the step S85 (i.e., the new report data 412 has been created), the user may trigger the bind report button 215 on the window interface 20, so that the window script program 2 writes a new binding label corresponding to the new report data 412 into the register of the variable library 5 to bind window interface 20 with the new report data 412 (step S87).

Figure 9:
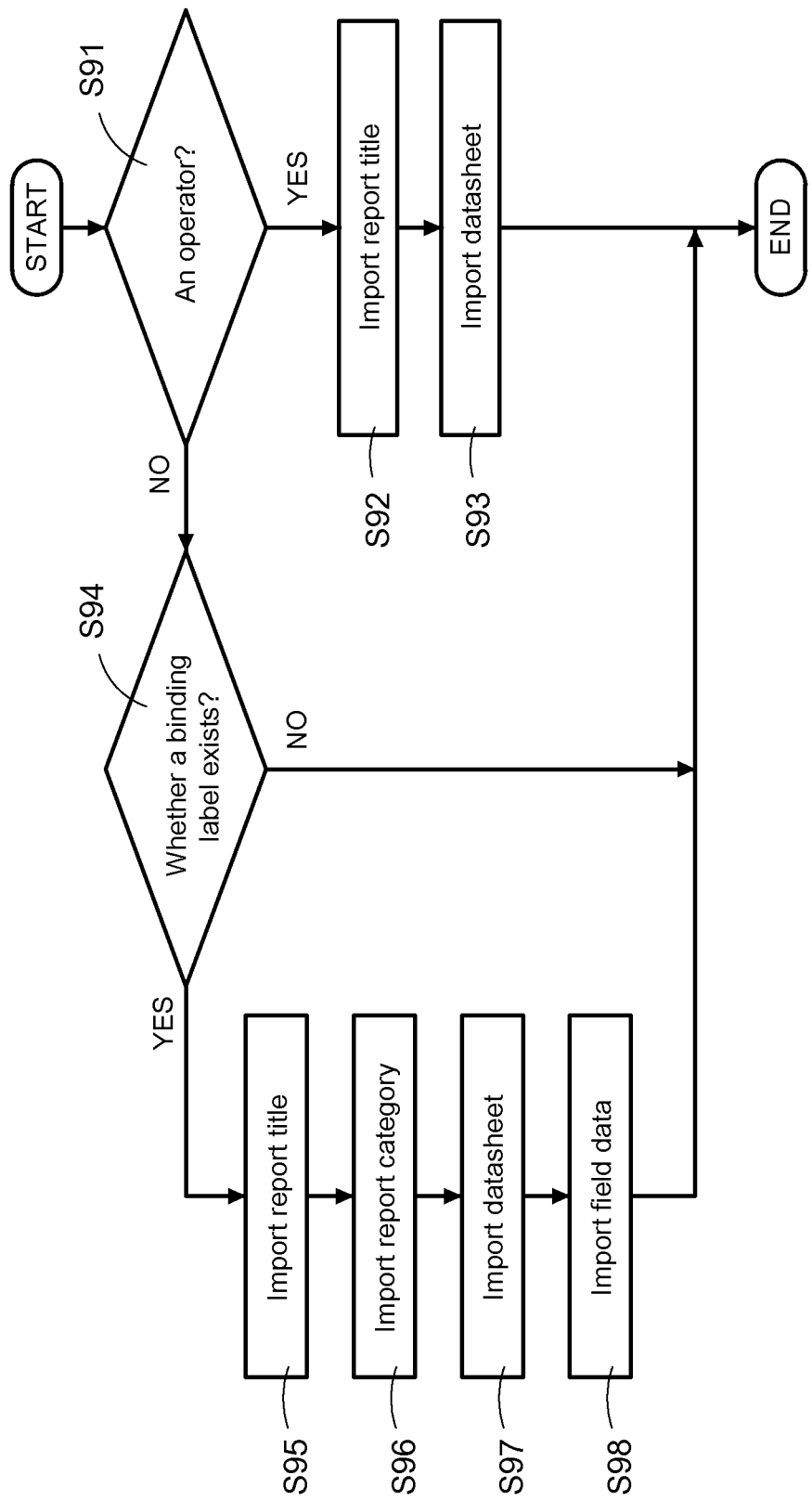
FIG. 9 is a flowchart showing an embodiment of a system operating procedure shown in FIG. 8 under a pre-load stage.

The flow shown in FIG. 9 is applied to the SCADA system 1 and the window script program 2 as shown in FIG. 1 and FIG. 2 and includes the following steps:

Step S91: Is a user an operator? If YES, proceeding step S92; if NO, proceeding step S94.

Step S92: Importing report title.

Step S93: Importing datasheet. End.

Step S94: Whether a binding label exists? If YES, proceeding step S95; if NO, end.

Step S95: Importing report title.

Step S96: Importing report category.

Step S97: Importing datasheet.

Step S98: Importing field data of the report. End.

In the step S91, the window script program 2 determines whether the user currently logging in is an operator to identify the authority of the user (i.e., the step S81 in FIG. 8). If the user currently logging in is determined as an operator, the window script program 2 automatically imports a random historical report or a designated historical report from the edited-data file 41 in the step S92 and the step S93 and imports the report title and the datasheet of the historical report into the window interface 20, and then terminates the pre-load stage.

If the user currently logging in is determined not an operator, the window script program 2 determines whether a binding label exists in the step S94 (i.e., the step S82 of FIG. 8). If a binding label is determined to be existed, the window script program 2 automatically imports the report title, the report category, the datasheet, and the field data (i.e., the multiple parameter fields) of the bound report into the window interface 20 in the step S95 to the step S98, and then terminates the pre-load stage. If no binding label is determined to be existed, the window script program 2 terminates the pre-load stage. It is easily understood that the step S91 to the step S93 of FIG. 9 are detailed steps according to the step S81 of FIG. 8 and the step S91 to the step S94 are detailed steps according to the step S82 of FIG. 8.

Figure 10:
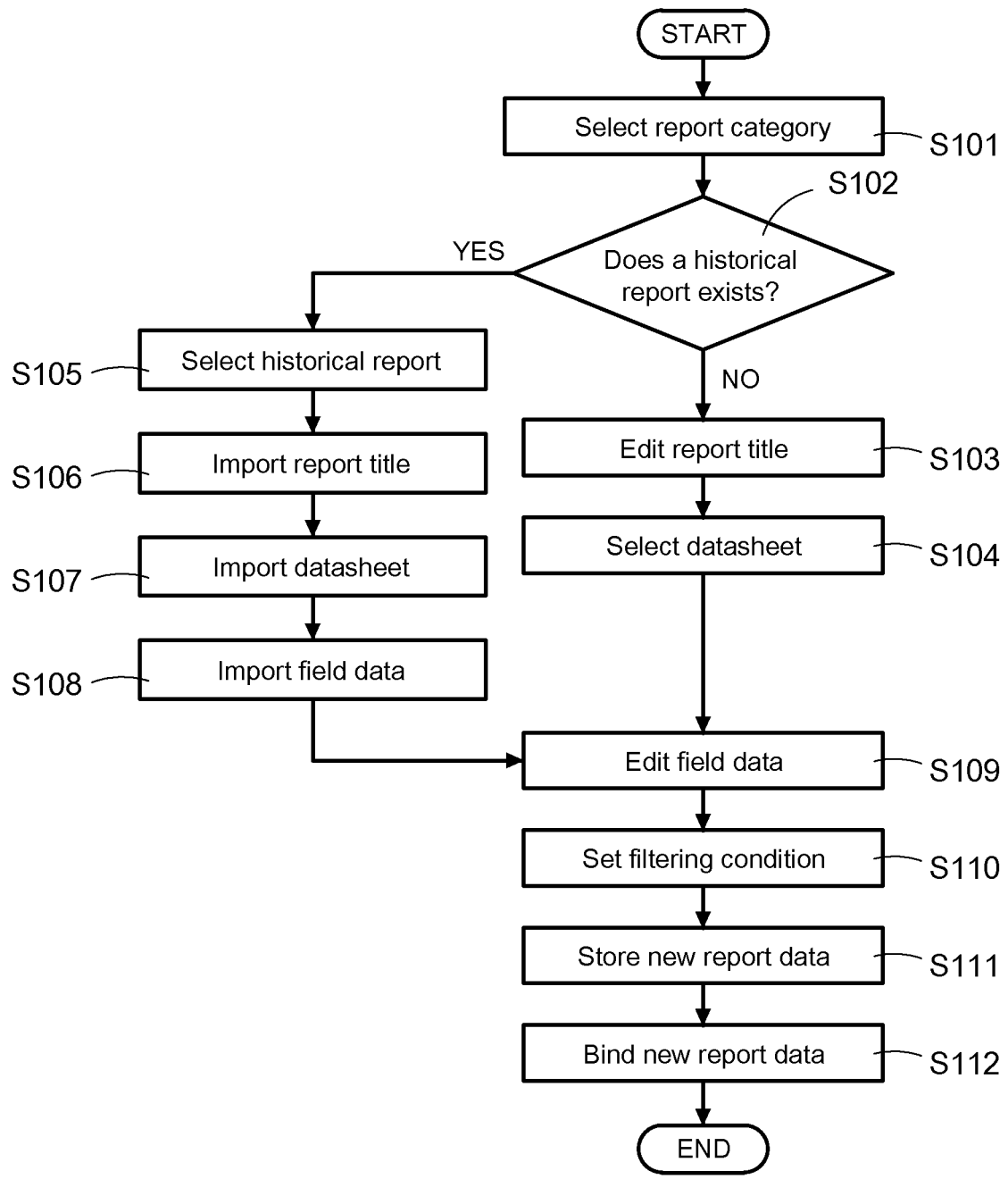
FIG. 10 is a flowchart showing an embodiment of a system operating procedure shown in FIG. 8 under an editing stage.

The flow shown in FIG. 10 is applied to the SCADA system 1, the window script program 2, and the window interface 20 as shown in FIG. 1 and FIG. 2 and includes the following steps:

Step S101: Selecting report category.

Step S102: Is a historical report exists? If YES, proceeding step S60; if NO, proceeding step S56.

Step S103: Editing report title.

Step S104: Selecting datasheet. Proceeding step S68.

Step S105: Selecting historical report.

Step S106: Importing report title.

Step S107: Importing datasheet.

Step S108: Importing field data.

Step S109: Editing field data.

Step S110: Setting filtering condition.

Step S111: Storing new report data.

Step S112: Binding new report data. End.

In step S101, the window script program 2 selects a report category in accordance with user's input. In the step S102, the window script program 2 inquiries whether a historical report exists in the edited-data file 41 in accordance with the selected report category. If multiple historical reports exist, the window script program 2 automatically imports the report title, the datasheet, and the field data (i.e., the multiple parameter fields) in accordance with a selected one of the multiple historical reports in the step S105, the step S106, the step S107, and the step S108. If no historical report exists, the window script program 2 receives the user's input to edit the report title and to select the datasheet through the window interface 20 in the step S103 and the step S104; furthermore, the window script program 2 reads the editing field corresponding to the selected datasheet from the machine file 41 to import the multiple parameter fields into the field menu 221.

In the step S109 and the step S110, the window script program 2 receives the user's input to edit the field data and to set the filtering condition through the window interface 20. In the step S111 and the step S112, the window script program 2 stores new report data and binds the new report data with the window interface 20. The operations with respect to FIG. 8, FIG. 9, and FIG. 10 are similar and related to the descriptions of FIG. 1 through FIG. 7, the detailed description is omitted.

In the present disclosure, multiple items of one report data may be considered as a set of multiple labels bound together, and each item has a binding relationship with each other. The window script program 2 may inquires a related set of labels (i.e., timestamp, editing field, report category, datasheet, and filtering condition) from the database 4 through a binding label (i.e., the report title), and then the window script program 2 may import all labels of one report data into corresponding functions for the window interface 20 to display the importing result correspondingly. Next time when the user executes the window script program 2 and opens the same window interface 20, the window script program 2 may automatically import an edited report being bound with the opened window interface 20 in accordance with the aforementioned technical solution. Besides, the user may re-edit the edited report (e.g., adjusting the parameter field(s) and setting the filtering condition(s) of the edited report), which is not restricted in only exporting the report data having fixed fields and content.

As the skilled person will appreciate, various changes and modifications can be made to the described embodiment. It is intended to include all such variations, modifications and equivalents which fall within the scope of the present disclosure, as defined in the accompanying claims.

What is claimed is:

1. A report editing method for a supervisory control and data acquisition (SCADA) system, comprising:
   a0) executing a window script program to activate one of multiple window interfaces, wherein the window interface comprises multiple editing areas, and each of the editing areas respectively comprises at least one field and at least one menu;
   a) upon activating the window interface, determining whether a binding label exists in a register of a variable library of the SCADA system, wherein the binding label indicates that a bound report which is completely edited and bound with the window interface being activated is stored in a database, and the binding label is recorded in a string format;
   b) when the binding label exists, inquiring an edited-data file of the SCADA system in accordance with the binding label to read report data of the bound report that is corresponding to the binding label, and automatically importing report items of the report data of the bound report into the at least one field and the at least one menu of the editing areas of the window interface being activated, wherein the binding label is a report title of the report data;

c) when no binding label exists, obtaining multiple report items through the window interface to create a new report and store the multiple report items as new report data to the edited-data file; and d) writing a new binding label corresponding to the new report data to the variable library to bind the window interface with the new report.

2. The report editing method in claim 1, wherein the multiple report items comprise a report title, a report category, a datasheet, and multiple parameter fields.

3. The report editing method in claim 2, wherein the binding label is the report title.

4. The report editing method in claim 2, wherein the multiple editing areas comprise:
   a report-item editing area, comprises:
   a report-title field, configured for receiving the report title;
   a report-category menu, configured for receiving a first operation to select the report category;
   a historical-report menu, configured for receiving a second operation to select a historical report; and
   a datasheet menu, configured for receiving a third operation to select the datasheet;
   a field editing area, comprising:
   a field menu, configured for receiving a fourth operation to select the multiple parameter fields; and
   an editing fields preview, configured for previewing the multiple parameter fields; and
   a bound-report displaying area, configured for displaying the binding label or the new binding label.

5. The report editing method in claim 4, wherein the report-title field is an input field; the report-category menu, the historical-report menu, the datasheet menu, and the field menu are drop-down menus.

6. The report editing method in claim 4, wherein the SCADA system comprises:
   a machine file, configured for storing raw data; and
   multiple SQL-based report modules;
   wherein, when one of the multiple editing areas is triggered, a corresponding one of the multiple report modules is called to access the edited-data file and the machine file.

7. The report editing method in claim 4, wherein the step b1) comprises:
   b2) importing the report title into the historical-report menu;
   b3) importing the report category into the report-category menu;
   b4) importing the datasheet into the datasheet menu; and
   b5) importing the multiple parameter fields into the field menu and the editing fields preview.

8. The report editing method in claim 7, wherein the multiple report items further comprise a filtering time, and the multiple editing areas further comprise a time editing area, wherein the time editing area is configured to receive a fifth operation to set the filtering time, and the filtering time is a specific time or a period of time; and the step b1) further comprises:
   b6) importing the filtering time into the time editing area.

9. The report editing method in claim 8, wherein the multiple report items further comprise a filtering condition, and the multiple editing areas further comprise a filter editing area, wherein the filter editing area is configured to receive a sixth operation to set at least one filtering condition; and the step b1) further comprises:

b7) importing the at least one filtering condition into the filter editing area.

10. The report editing method in claim 9, further comprising:
    e1) inquiring a machine file in accordance with the report title, the report category, the datasheet, the multiple parameter fields, and the filtering time to display an exporting report; or
    e2) inquiring the machine file in accordance with the report title, the report category, the datasheet, the multiple parameter fields, the filtering time, and the at least one filtering condition to display the exporting report.

11. The report editing method in claim 4, wherein in a pre-load stage of the SCADA system, further comprises following steps before the step a):
    a1) identifying an editing authority of a user;
    a2) reading and importing the report title and the datasheet of the historical report into the window interface if the user doesn't have the editing authority;
    a3) executing the step a) and the step b) if the user has the editing authority; and
    a4) terminating the pre-load stage if the step c) determines that no binding label exists.

12. The report editing method in claim 11, wherein in an editing stage of the SCADA system, further comprising:
    e1) receiving a seventh operation through the report-category menu to select the report category;
    e2) inquiring the historical report corresponding to the report category from the edited-data file in accordance with the report category;
    e3) when no historical report corresponding to the report category exists:
    receiving the report title through the report-title field;
    receiving an eighth operation through the datasheet menu to select the datasheet; and
    inquiring the multiple parameter fields corresponding to the datasheet from the edited-data file to import into the field menu; and
    e4) receiving the historical report through the historical-report menu and executing the step b1) when the historical report corresponding to the report category exists.

13. The report editing method in claim 12, wherein after the step e3) and the step e4), further comprises:
    e5) receiving a ninth operation through the field menu to select the multiple parameter fields;
    e6) receiving a tenth operation through a filter editing area to set at least one filtering condition;
    e7) storing the report title, the report category, the datasheet, the multiple parameter fields, and the at least one filtering condition to the edited-data file to add the new report data; and
    e8) writing the new binding label corresponding to the new report data to the variable library to bind the window interface with the new report data.

14. The report editing method in claim 4, wherein the field editing area comprises:
    an import all button, configured for importing all of the multiple parameter fields included in the field menu into the editing fields preview;
    a clear all button, configured for clearing all of the multiple parameter fields displayed by the editing fields preview;
    a delete field button, configured for deleting one of the multiple parameter fields selected by the field menu from the editing fields preview; and a move forward button, configured for moving one of the multiple parameter fields selected by the field menu forward in the editing fields preview to adjust an order of the multiple parameter fields displayed by the editing fields preview.

15. The report editing method in claim 1, wherein the binding label is stored in the register of the variable library in a string format, wherein no binding label exists in the variable library if the variable library is NULL or has an invalid string, and the binding label exists in the variable library if the variable library has a valid string.

* * * * *